United States Patent Office 3,568,438
Patented Mar. 9, 1971

3,568,438
SYNTHESIS PLANT
Hans Meienberg, Forch-Scheuren, Switzerland, assignor to Escher Wyss Limited, Zurich, Switzerland
Filed Aug. 4, 1969, Ser. No. 847,055
Claims priority, application Switzerland, Aug. 23, 1968, 12,709/68
Int. Cl. F01k 25/00
U.S. Cl. 60—36
3 Claims

ABSTRACT OF THE DISCLOSURE

A synthesis plant having a synthesis gas compressor, a reactor, a condenser and a circulating turbo-compressor connected into the closed circuit formed by said reactor and by the gas section of said condenser. A product steam turbine is provided for driving said circulating turbo-compressor, which is preceded by a heat exchanger for heating the product serving as working medium for said product steam turbine, said heat exchanger being arranged at the outlet side of said reactor, the working medium thus being heated with process heat, said product steam turbine and said circulating turbo-compressor being arranged in a common housing and being directly coupled through a common shaft, and the bearings of said common shaft being lubricated with process medium, i.e. with synthesis gas or with product.

BACKGROUND OF THE INVENTION

Conventional synthesis plants comprise a synthesis gas compressor, a reactor, a condenser and a circulating turbo-compressor connected into a closed circuit formed by the reactor and by the gas section of the condenser. It is known to use process heat forming in such plants for the generation of steam, which provides power in a steam turbine, or to supply a gas turbine, it also being possible for these turbines to be used for driving the circulating turbo-compressor. With known circulating turbo-compressors, the shafts thereof extend through the compressor housings from the generating or working space into the atmosphere so as to be coupled to the driving engines, such as electric motors or turbines. This arrangement makes stuffing boxes necessary, and these have to be made particularly good in view of the high pressures obtaining in such circulating turbo-compressors, so that the losses by comparison with the useful efficiency are not impermissibly high. Stuffing boxes are certainly known which guarantee a sufficient tightness for such a use. Nevertheless, such stuffing boxes demand high standards as regards materials and workmanship and necessitate numerous auxiliary assemblies, and this incurs high expense and complicates supervision during operation.

On the other hand, solutions are known in which the circulating compressor and parts of the electric motor are incorporated into the cycle channel, so that it is unnecessary for the shaft to extend outwardly. However, this solution has the disadvantage that the circulating turbo-compressor has to run at the speed of rotation of the motor, which is too low for a practical construction and consequently necessitates a high number of stages of the compressor.

When the product in such synthesis plants is employed in the usual manner at a pressure which is substantially below the process pressure, another disadvantage is that the energy delivered by the process end pressure is unprofitably destroyed in a throttling device.

SUMMARY OF THE INVENTION

It is the object of the present invention to overcome the disadvantages of the known synthesis plants. To this purpose a synthesis plant of the type therebefore described is proposed in accordance with the invention, which is characterised by the following features:

(a) A product steam turbine is provided for driving the circulating turbo-compressor, which is preceded by a heat exchanger which is advantageously at least partially heated with process heat and of which the product section is connected on the input side with the product section of the condenser.

(b) The product steam turbine and the circulating turbo-compressor are arranged in a comon housing, sealed off without stuffing boxes from the atmosphere and directly coupled through a common shaft.

(c) The bearings of the common shaft of the steam turbine and of the circulating turbo-compressor are formed as bearings lubricated with process medium.

BRIEF DESCRIPTION OF THE DRAWING

Two embodiment examples of the invention are represented in the drawing, in which.

DESCRIPTION OF THE PREFERRED EMBODIMENTS

Figure 1:
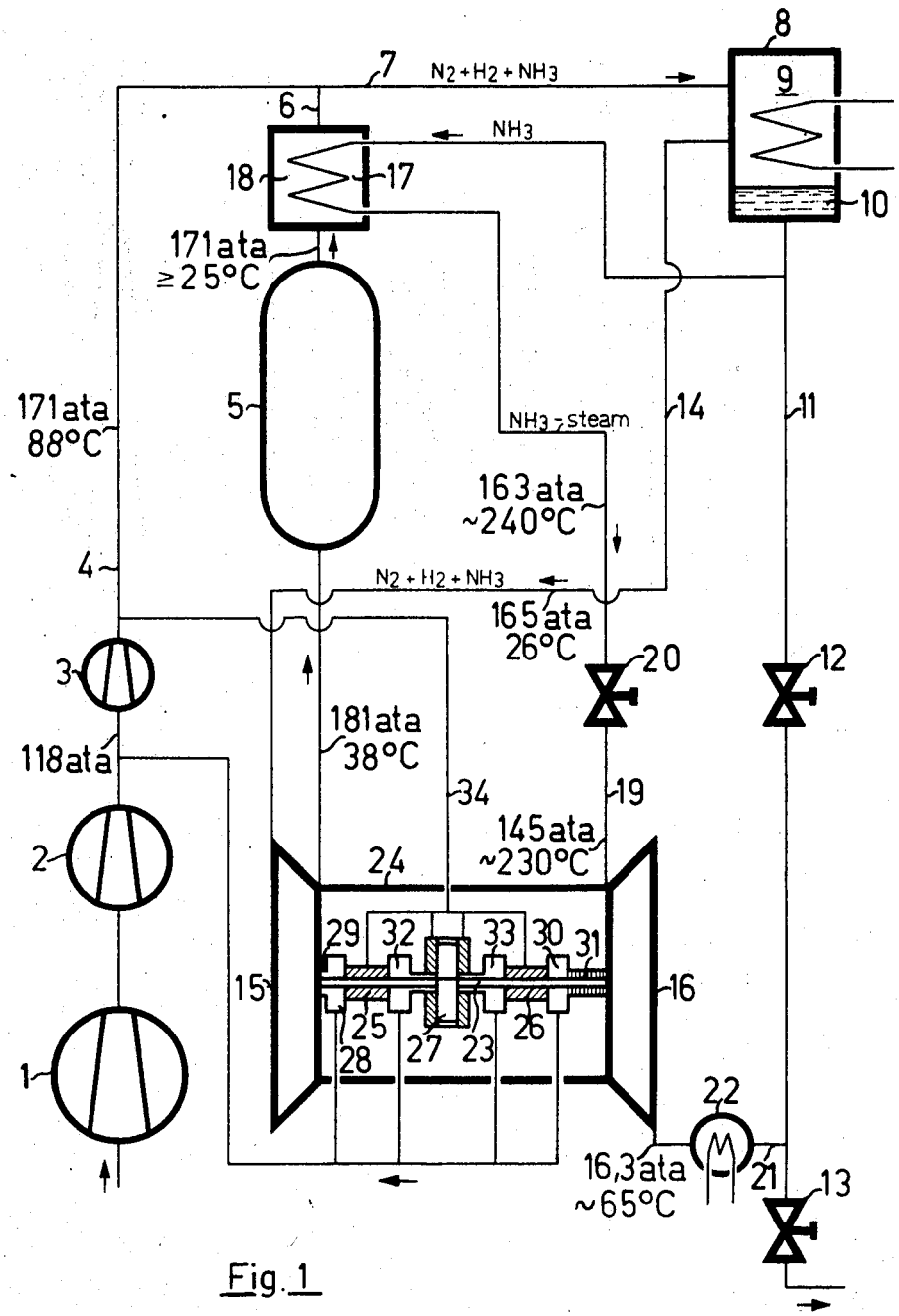
FIG. 1 shows a diagram of a plant for the manufacture of ammonia, in which the bearings of the shaft of the two turbo-machines are lubricated with synthesis gas.

The plant which is illustrated in FIG. 1 comprises synthesis gas compressors 1, 2 and 3 which are connected in series and from which a synthesis gas pipe 4 is connected to a reactor pipe 6 coming from a reactor 5; from this point, a mixture pipe 7 conveying synthesis gas from the synthesis gas pipe 4 and ammonia vapour and also synthesis gas residues from the reactor 5 leads to a cooling arrangement 8 which is designed as a condenser and which has a gas section 9 and a product section 10. From the product section 10 of the condenser 8, an ammonia pipe 11, into which are incorporated pressure-regulating valves 12, 13, leads to a storage arrangement and/or consumer, not shown. Extending from the gas section 9 of the condenser to the input of the reactor 5 is a return pipe 14 which conveys product gas, which in the present case is ammonia gas and residues of synthesis gas, and a circulating turbo-compressor 15 is connected into said pipe. The reactor 5, the gas section 9 of the condenser 8 and the circulating turbo-compressor 15 form a closed circuit 5, 9, 15.

Preceding a product steam turbine 16 constructed as an ammonia vapour turbine is a heat exchanger 17, of which the product section 18 carrying ammonia is connected on the input side to the product section 10 of the condenser 8. The heat exchanger 17 is included on the heating side in the reactor pipe 6. A pressure-regulating valve 20 is connected into the turbine pipe 19 leading from the condenser to the product steam turbine 16, between the heat exchanger 17 and the said turbine 16. From the outlet of the turbine 16, a waste steam pipe 21, in which is included a condenser 22, opens between the pressure-regulating valves 12, 13 into the ammonia pipe 11.

The product steam turbine 16 and the circulating turbo-compressor 15 are arranged in a common housing 24 so as to be sealed off from the atmosphere without stuffing boxes and directly coupled through a common shaft 23.

The shaft 23 is mounted in radial bearings 25, 26 and in an axial bearing 27. Arranged on the compressor side of the radial bearing 25 is a suction chamber 28, which is sealed off from the circulating compressor 15 by a gap seal 29. Arranged on the turbine side of the radial bearing 26 is a suction chamber 30, which is sealed off from the product steam turbine 16 by a labyrinth seal 31. Arranged between the radial bearings 25 and 26 and the axial bearing 27 are suction chambers 32 and 33, respectively. A lubricating pipe 34 branches off from the synthesis gas pipe 4 and leads to the bearings 25, 26, 27, which are lubricated with synthesis gas. All suction chambers are connected through suction pipes to the input of the synthesis gas compressor 3.

The functioning of the plant is readily apparent, on the basis of the data regarding temperature and pressure for the process medium, which are included in the drawing and are given solely by way of example. At least a partial stream of the product which is under process end pressure, this being liquid ammonia in the present case, which originates from the liquid section 10 of the condenser 8, is vaporised in the heat exchanger 17 by means of process heat, and the product steam is reduced in the pressure-regulating valve 20, which also works as an operational and emergency closure valve, is reduced to the pressure necessary for the rate of power input of the product steam turbine 16 and drives the said turbine, which delivers its power to the circulating turbo-compressor 15. The waste steam of the product steam turbine is condensed in the condenser 22 at the pressure prevailing on the outlet side.

Leakage losses of the two turbo machines 15, 16 are impossible, because of their arrangement in the common housing 24 without stuffing boxes for sealing off against the atmosphere. The pressure data necessary for understanding the circuit for the lubricant are apparent from the drawing. Any transfer of ammonia into the synthesis gas circulation is harmless in any case, and the pressure difference between the separate chambers to be sealed off from one another in the common housing 24 of the two turbo machines 15, 16 are so slight that no great expense is necessary for the seals 29, 31.

By means of the steps according to the invention, a circulating group is obtained in a synthesis plant, with which the sealing of the shaft of the circulating turbo-compressor from the atmosphere and also the lubrication of the bearings of this shaft are reliably solved with extremely simple means, and with which also the process heat is used for driving the circulating turbo-compressor. An additional advantage of the plant is that the energy given by the process end pressure can additionally be utilised for driving the circulating turbo-compressor, because usually the product is employed at a pressure which is substantially below the process end pressure.

In the constructional example as illustrated, the product supplied to the product steam turbine 16 is exclusively heated with process heat taken from the process in the heat exchanger 17. Obviously, the product in the turbine pipe 19 could however also be partially or entirely heated with outside heat, or the heat to be supplied to the product in the turbine pipe 19 could be wholly or partly taken from other positions in the plant. In those cases where more process heat originates than corresponds to the power output of the product steam turbine 16, the excess heat must be supplied to another consumer or discharged through a condenser. In practice, the plant also comprises numerous pressure regulating valves which are not shown in the constructional example, this being obvious and familiar to the expert.

Figure 2:
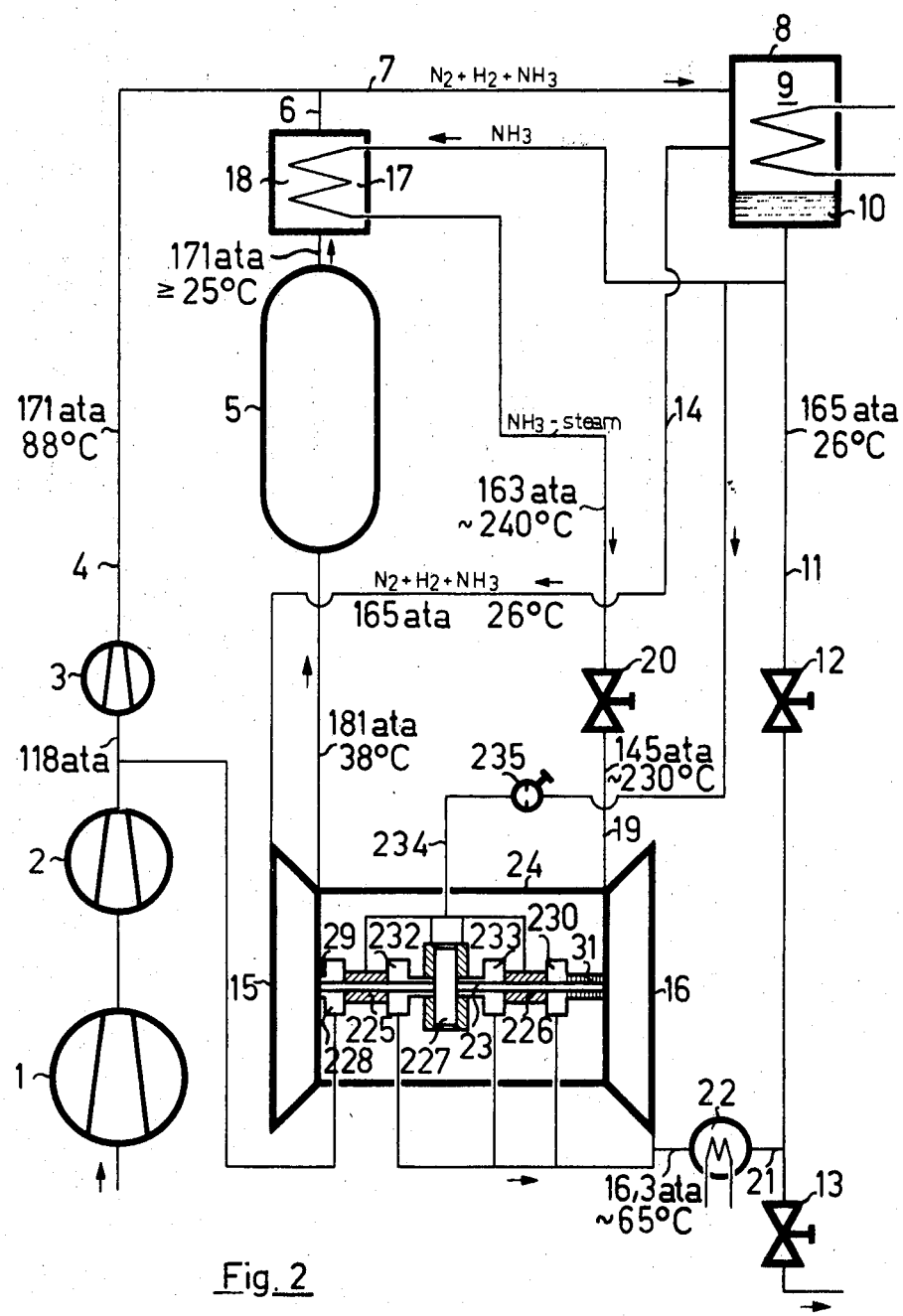
FIG. 2 shows a diagram of such a plant, in which the bearings of the shaft of the two turbo-machines are lubricated with ammonia, the like parts in the two figures having the same references.

The plant which is shown in FIG. 2 comprises bearings 225, 226 and 227, which are lubricated with product, which in the present case is ammonia. The lubricating pipe 234 branches off from the ammonia pipe 11. The suction pipe of the suction chamber 228 leads to the input of the synthesis gas compressor 3 and the suction pipes of the suction chambers 230, 232 and 233 open into the waste steam pipe 21. Incorporated into the lubrication pipe 234 is an adjustable throttle valve 235, by means of which the mean lubricating pressure is lowered to the required value.

I claim:

1. A synthesis plant, comprising in combination a synthesis gas compressor (1, 2, 3), a condenser (8) with a gas section (9) and a product section (10), a reactor (5) and a circulating turbo-compressor (15), a synthesis gas pipe (4) parting from the outlet of said synthesis gas compressor (3) and a reactor pipe (6) parting from the outlet of said reactor (5), both said pipes (4, 6) opening into a mixture pipe (7) which opens into the gas section (9) of said condenser (8), a product pipe (11) with an incorporated pressure-regulating valve (12) parting from the product section (10) of said condenser (8), a return pipe (14) parting from the gas section (9) of said condenser (8) and opening into the inlet of said reactor (5), said circulating turbo-compressor (15) being connected into said return pipe (14), said circulating turbo-compressor (15) thus being connected into a closed circuit (5, 9, 15) formed by said reactor (5) and the gas section (9) of said condenser (8), in which plant are provided a product steam turbine (16) for driving said circulating turbo-compressor (15) and a heat exchanger (17) for heating the product serving as working medium for said product steam turbine (16) with process heat, the product section (18) of which is connected into a product steam pipe (19) parting from the product section (10) of said condenser (8) and opening into the inlet of said product steam turbine (16), the heating section of said heat exchanger (17) being included in said reactor pipe (6), a waste steam pipe (21) parting from the outlet of said product steam turbine (16) and opening into said product pipe (11) at a point situated, as viewed in the direction of the flow of the product, behind said pressure-regulating valve (12); in which plant said product steam turbine (16) and said circulating turbo-compressor (15) are arranged in a common housing (24) and are directly coupled through a common shaft (23) so as to be sealed off without stuffing box from the atmosphere; and in which plant bearings (25, 26, 27 resp. 225, 226, 227) for said common shaft (23) of said product steam turbine (16) and said circulating turbo-compressor (15) are provided, which are connected with a lubricating pipe (34, 234) parting from the process circuit at a point of relatively high pressure (4, 10) and with at least one suction pipe opening into the process circuit at a point of relatively low pressure (2, 3 resp. 21), said bearings thus being lubricated with process medium.

2. An arrangement as defined in claim 1, in which said lubricating pipe (34) parts from said synthesis gas pipe (4), said bearings (25, 26, 27) of said common shaft (23) of said product steam turbine (16) and said circulating turbo-compressor (15) thus being lubricated with synthesis gas.

3. An arrangement as defined in claim 1, in which said lubricating pipe (234) parts from the product section (10) of said condenser (8), said bearings (225, 226, 227) of said common shaft (23) of said product steam turbine (16) and said circulating turbo-compressor (15) thus being lubricated with product.

References Cited

UNITED STATES PATENTS

| | | | |
|---|---|---|---|
| 3,038,318 | 6/1962 | Hänny | 62—402X |
| 3,105,631 | 10/1963 | Hänny | 62—402X |
| 3,292,366 | 12/1966 | Rice et al. | 60—36 |

FOREIGN PATENTS

| | | | |
|---|---|---|---|
| 1,003,771 | 3/1957 | Germany | 62—402 |
| 1,166,797 | 4/1964 | Germany | 62—402 |

MARTIN P. SCHWADRON, Primary Examiner
R. BUNEVICH, Assistant Examiner

U.S. Cl. X.R.

184—6